Patented Apr. 5, 1938

2,112,828

UNITED STATES PATENT OFFICE 2,112,828

BEE-VENOM AND PROCESS FOR OBTAINING THE SAME

Emil Bühler, Zurich, Switzerland, assignor to Hoffmann-La Roche Inc., Nutley, N. J., a corporation of New Jersey No Drawing. Application March 26, 1936, Serial No. 71,051. In Germany April 25, 1935

2 Claims. (Cl. 167—74)

Various processes for obtaining bee-venom are already known. In order to obtain a reasonable amount of the venom, Langer (Archiv für experimentelle Pathologie und Pharmacologie, vol. 38, 1897, page 385) pulled out the stings of the bees together with their appendages and dried and powdered them. The venom was then dissolved from the fine powder with water. In this manner, however, a very impure yellow-brown aqueous solution was obtained.

In order to obtain larger quantities of impure bee-venom by a quicker method, Flury (Archiv für experimentelle Pathologie und Pharmacologie, 85, 1920, page 321) put a swarm of bees in a large percolator and induced the animals to give up their venom by subjecting them to the action of ether vapour. The slightly narcotized bees were taken out and put into large funnels and sprayed with the smallest possible quantity of water. The washings containing the venom were yellowish in colour and somewhat turbid.

For special purposes the two investigators also endeavoured to obtain the venom in pure form. The tiny drop of venom released by the bee sting was taken up in a drop of water (Archiv für experimentelle Pathologie und Pharmacologie, vol. 38, 1897, page 384), or the bees were placed on a thick moistened filter-paper which absorbed the venom given up by the bees on stinging. The paper containing the venom was dried and portions impurified with excrement were removed as far as possible (Archiv für experimentelle Pathologie und Pharmacologie, vol. 38, 1897, page 385; vol. 85, 1920, page 324).

These processes are, however, of no use for the preparation of large quantities of the venom, a fact which the earlier investigators have likewise admitted.

It has now been found that bee-venom may be obtained in pure form and in good yield, if the bees are induced to sting through animal hides which are rough on the side where the sting enters and smooth on the other side; the hide should be just thick enough to allow the sting to pass through it. In this manner the venom collects on the side opposite the entrance of the sting and after it has dried it can be removed by scraping or other suitable means.

The use of hides which are rough on the side where the sting enters makes it easier for the bees to sting because the sting is prevented from slipping off. The sting and the excrement remain on the side where the sting enters. The drops of venom which are secreted from the sting and adhere to the smooth opposite side of the hide can easily be removed after drying. The thickness of the hide should be such as to enable the bee sting to penetrate to the opposite side in the act of stinging. By a suction appliance below the hide the yield may be increased, as in this manner a more complete emptying of the venom gland is obtained.

For obtaining bee-venom by the method just described one may for instance proceed in the following manner: The bees are seized in a pair of tweezers and placed on the rough side of the hide, which consists of a sheet of tanned goat or sheep leather and has an average thickness of ¼ mm. By gentle pressure the bees are made to sting. The sting penetrates the hide and remains therein, whereupon the bee tears itself away and loses its sting. Even after its removal from the bee the muscular system of the sting continues to operate and pumps venom out of the venom gland onto the opposite side of the hide. In order to assist this process suction is exerted beneath the hide. In this manner a considerable portion of the venom is obtained which would otherwise have remained in the venom gland. From 1000 bees about 0.07 gram of dry venom is obtained. The dried bee-venom which has accumulated on the smooth opposite side of the hide is scraped off. By dissolving in water, filtering to remove some tips of stings which may also have been scraped off and precipitating with alcohol the venom is completely purified.

The determination of its ash content and likewise of its tryptophane content according to Fürth and Nobel (Biochemische Zeitschrift vol. 109, 1920, page 103) serves as chemical criterion for the purity of the bee-venom. The ash content of the bee-venom obtained by the process just described is very small (about 2.5%). The protein component of this bee-venom contains much tryptophane, 7–8% calculated on the total quantity of the venom. Bee-venom obtained by other methods is much poorer in tryptophane.

A sensitive and sure proof of the integrity of the bee-venom obtained by the process of this invention consists in the determination of the hemolytic index which has been found to be 1:500.000. Its toxicity is 3 milligrams per kilogram body weight of a mouse.

I claim:

1. The process for obtaining bee-venom which consists in inducing the bees to sting through a tanned animal hide selected from the group consisting of tanned goat and sheep hides, said hide being rough on the side where the sting enters and smooth on the opposite side and just thick enough to allow the sting to penetrate, and removing the dried venom which has accumulated on the opposite side of the hide by scraping and similar methods.

2. The process for obtaining bee-venom which consists in inducing the bees to sting through a tanned animal hide, selected from the group consisting of tanned goat and sheep hides, said hides being rough on the side where the sting enters and smooth on the opposite side and just thick enough to allow the sting to penetrate, exerting suction on the opposite side of the hide during the act of stinging and removing the dried venom which has accumulated on the opposite side of the hide by scraping and similar methods.

EMIL BÜHLER.